May 5, 1959  P. C. SMITH  2,884,733
FISHING LURE AND COUPLINGS
Filed Sept. 25, 1956
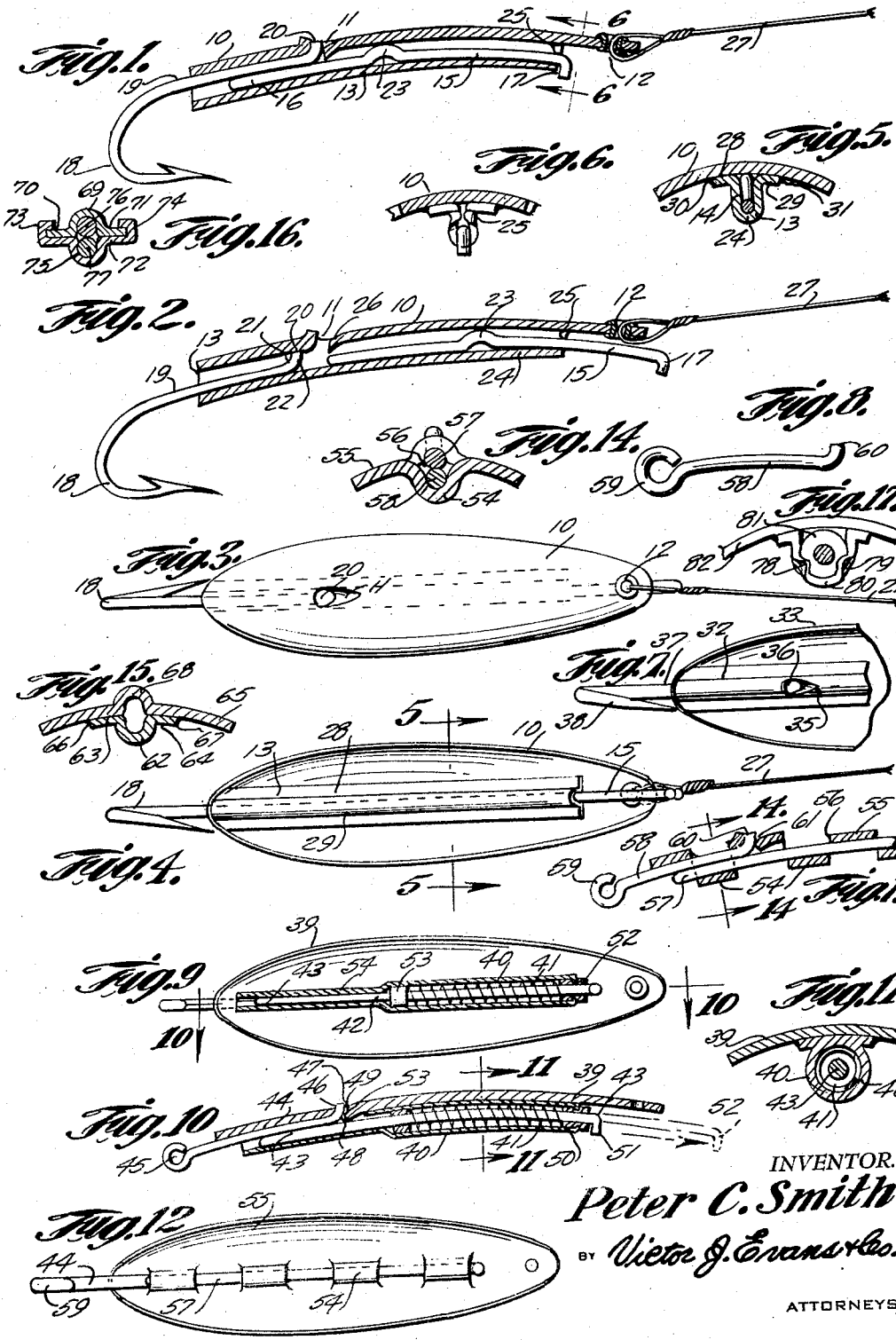
INVENTOR.
Peter C. Smith
BY Victor J. Evans & Co.
ATTORNEYS

United States Patent Office 2,884,733
Patented May 5, 1959

2,884,733

FISHING LURE AND COUPLINGS

Peter C. Smith, Perth Amboy, N.J.

Application September 25, 1956, Serial No. 611,953

5 Claims. (Cl. 43—42.38)

This invention relates to fishing lures and couplings of the type having detachable hooks, rings, or eyes to facilitate removing fish from fishing lines, and in particular a lure including an arcuate spoon having a key providing a cam action slidably mounted in a channel bar on the inner surface and having a hook or eye with a projection on the end of the shank whereby with the shank of the hook inserted into the channel bar the cam action of the key guides the projection on the end of the shank into an opening in the spoon locking the hook or eye in the channel bar, and wherein upon withdrawing the key the hook is readily released.

Reference is made to my co-pending applications with the Serial Numbers 623,331 and 624,921, showing similar structure.

The purpose of this invention is to provide a fishing lure having a detachable hook in which the hook is snapped into locking engagement with the lure as the shank thereof is forced into a channel of the lure.

Various types of fishing lures have been provided with detachable hooks, however, it is difficult, particularly in inclement weather to insert a hook in one end of a lure with one hand and operate locking means with the other hand and, furthermore, it is difficult to hold a hook in such a position that a projection on the shank thereof is in registering relation with a notch or opening of the lure. With this thought in mind this invention contemplates a fishing lure in which the shank of a hook is inserted in an open channel and as the end of the shank reaches a predetermined position the cam element in the channel guides a projection on the shank into a notch or opening wherein the fish hook is locked as it is inserted in the lure.

The object of this invention is, therefore, to provide a fishing lure having a removable hook in which the hook is readily locked in the lure as it is inserted therein without the necessity of operating the locking means.

Another object of the invention is to provide a fishing lure having a removable hook in which it is impossible for the hook to be accidently displaced from the lure.

Another important object of the invention is to provide a fishing lure having a detachable hook in which the hook is retained in the lure until manually released.

A further object of the invention is to provide an improved fishing lure having a detachable hook, in which the lure is of a simple and economical construction.

With these and other objects and advantages in view the invention embodies a fishing lure having an arcuate body with a line attaching eye at one end and with an opening extended through the intermediate part, a channel-shaped bar extended from the inner surface of the body, a key having friction retaining means thereon slidably mounted in the channel bar, the key also having a cam surface on one end and a gripping element extended from the opposite end.

Other features and advantages of the invention will appear from the following description taken in connection with the drawing, wherein:

Figure 1 is a longitudinal section through the lure showing the fishing line extended from one end of the body and also showing a removable fish hook locked in the body with a key.

Figure 2 is a view similar to that shown in Fig. 1 showing the positions of the parts with the fishing hook released from the locking means.

Figure 3 is a plan view of the lure.

Figure 4 is a view looking upwardly toward the under surface of the lure.

Figure 5 is a cross section through the lure taken on line 5—5 of Fig. 4.

Figure 6 is a similar section taken on line 6—6 of Fig. 1.

Figure 7 is a view looking upwardly toward the under surface of the lure showing a modification wherein the notch or opening for receiving the projection on the end of the shank of the hook is positioned in the channel bar instead of in the body of the lure, as shown in Fig. 3.

Figure 8 is a view showing a shank with an eye on the extended end having a projection, similar to that of the shank of the fish hook shown in Fig. 1 wherein the gang hook or other device may be attached to the eye of the shank.

Figure 9 is a view looking upwardly toward the under surface of the body of the lure showing a further modification wherein the locking key is retained in the locking position with a spring, the spring barrel and channel portion of the device being shown in section.

Figure 10 is a longitudinal section through the lure shown in Fig. 9 being taken on line 10—10 thereof, showing the parts in locking positions in full lines and showing the end of the key in the position in which the shank or bar is released, in broken lines.

Figure 11 is a cross section through the lure taken on line 11—11 of Fig. 10.

Figure 12 is a view showing a further modification wherein the bar or shank of a hook and locking key are mounted in eyes struck from the body of a lure or the like.

Figure 13 is a longitudinal section through the lure shown in Fig. 12 with the forward part of the lure broken away.

Figure 14 is a cross section through the lure shown in Figs. 12 and 13 being taken on line 14—14 of Fig. 13.

Figure 15 is a cross section through a channel formation, illustrating a modification wherein one portion of a channel is formed in a spoon, plate, or other backing member and the other portion is formed with a strip of material, U-shaped in cross section and having flanges extended from the edges.

Figure 16 is a cross section through a channel formation showing a further modification wherein a channel is formed inside of a squid with one portion of the channel formed in a strip of material and another in a backing member and with the edges of the backing member folded over edges of the strip, of material.

Figures 17 is an end elevational view of a lure as shown in Figs. 9 and 10 wherein the spring is retained in position by tabs bent inwardly from the ends of a cylindrical channel member.

Referring now to the drawing wherein like reference characters denote corresponding parts the improved fishing lure and coupling of this invention includes a body 10, formed with an arcuate plate having an opening or notch 11 in the intermediate part and an eyelet 12 in the leading end, a U-shaped channel member 13 positioned on the inner surface of the body 10 and having an elongated slot 14 providing an open channel therein, a key 15 having a cam surface or tapering nose 16 on the inner end and a lug 17 on the opposite end and a fish hook 18 having a shank 19 and a projection 20 with arcuate surfaces 21 and 22 thereon extended from the end of the shank and positioned to extend through the opening 11 of the body of the lure as the shank 19 of the lug is inserted in the channel 14.

The spoon or body 10 is illustrated as being arcuate in cross section and also in longitudinal section and the body which is provided with tapering arcuate ends may be of any suitable type or design. The channel 14 may be formed on one surface by suitable means.

With the parts as illustrated in Figs. 1, 2, and 5 the key 15 is provided with an arcuate section 23 which extends to such a point that the key is frictionally held in the channel 14 and the lug 17 at the end of the key is urged against the outer portion 24 of the channel bar by tabs 25 crimped inwardly from the ends of the side walls of the channel bar 13.

By this means, and with the parts as illustrated in Fig. 2, the projection 20 on the end of the shank 19 of the fish hook snaps into the opening 11 as the hook is pressed into the body of the lure and with the cam surface 16 on the end of the key providing a guide. The arcuate surface 22 on the end of the shank 19 of the fish hook contacts the cam surface or guide 16 as the end of the projection 20 engages the inwardly extended portion 26 of the wall of the body 10 whereby the projection 20 slides upwardly into the notch or opening 11 and with the projection extended into the opening, as shown in Fig. 1, the key 15 is pressed inwardly with the end upon which the surface 16 is positioned sliding between the shank and outer wall 24 of the channel bar, locking the projection in the opening whereby it is impossible for the fish hook to be released from the lure until the key 15 is withdrawn. The lure is attached to a fishing line 27 as shown.

The channel bar 13 in which the key 15 is positioned is secured to the body 10 by suitable means, and as shown in Fig. 5 the channel bar is provided with flanges 28 and 29 and, the edges of the flanges are secured to the surface of the body 10 by welding, as shown at the points 30 and 31, or by other suitable means. The channel bar may also be formed with loops struck from the body of the lure, as shown in Figs. 12 and 14 or by other means.

In the design shown in Fig. 7 a channel bar 32 similar to the channel bar 13 is secured to the under surface of a spoon 33 and the arcuate surface 34 of the channel bar, similar to the surface 24, is provided with a notch or opening 35 in which a lug or projection 36 on the end of a shank 37 of a hook 38 is positioned with the hook locked into the lure. By this means the hook may be turned downwardly, as shown in Fig. 1 or so that it extends upwardly from the opposite side of the body.

In the design illustrated in Figs. 9 and 10 a spoon 39, similar to the spoon or body 10 is provided with a barrel 40 in which a spring 41 is positioned and, in this design, a staff 42, similar to the key 15 extends through the spring and the extended end 43 that extends below a shank 44 of an eye 45 is locked with the shank 44 against the under surface of the body 39 wherein a projection 46 on the end of the shank 44 is retained in a locking position with the projection in an opening 47 of the body of the lure. In this design the arcuate surface 48 of the projection 46 of the shank 44 engages the upwardly extended portion 49 of the body 39 whereby the projection 46 is snapped into the opening 47.

The outer end of the barrel 40 is provided with a bushing 50 in which the outer end of the key 43 is slidably mounted and with the lug 51 extended beyond the outer surface of the barrel 40 the lug may readily be gripped by the thumb or thumb nail and drawn outwardly to the position shown in broken lines and indicated by the numeral 52. In this position the spring is depressed and upon release of the lug 51 the spring snaps the key inwardly to the position shown in Fig. 10 whereby the projection 46 is locked in the opening 47. The lure is also provided with an offset or inwardly extended portion 53 to facilitate guiding the projection 46 into the opening. One end of the spring 41 bears against the inner end of the bushing 50 and the opposite end is in contact with a collar 53 that is secured to the latch or key 42. From the end of the spring barrel 40 the channel bar is reduced providing a section 54, the diameter which is less than that of the barrel 40.

In the design shown in Figs. 12 and 13 loops 54 extend from the body or plate 55 providing openings 56 in the body and also providing a channel through which a key 57 and a stem 58 of an eye 59 extends; and with the key 57 positioned as shown in Fig. 13 a projection 60 on the end of the stem 58 is retained in an opening 61 in the plate 55.

The open channel through which a key and shank of the hook extend is, therefore, adapted to be provided in different designs and the key may be actuated by suitable means.

With a detachable hook removably mounted in a lure, as shown and described a fisherman may carry comparatively few lures and a relatively large number of fish hooks whereby one hook may readily be removed and another inserted in place thereof so that hooks of different sizes may be used.

In the design shown in Fig. 15 the channel bar 62 having flanges 63 and 64 is secured to a spoon or plate 65 by suitable means, such as by welding, as shown at the points 66 and 67 and the plate 65 is provided with a channel section 68 that is positioned to coact with the channel 62 to form an elliptical shaped opening or channel in which the stem of a hook and a cam acting key may be positioned.

In Fig. 16 the channel bar 69 having flanges 70 and 71 is positioned against a plate 72 with flanges 73 and 74 at the edges of the plate crimped over the edges of the flanges 70 and 71 whereby the parts are clinched together. In this design a portion 74 of the channel is formed in the member 69 and the other half or portion 75 is formed in the body or plate 72. The shank 76 of the hook is positioned in the opening 74 and the cam acting key 77 in the opening or channel 75.

In Fig. 17 tabs 78 and 79 are formed from the channel member 80, similar to the member 40, shown in Fig. 11, providing means for retaining a spring 81 in a channel positioned between the member 80 and a spoon or plate 82, similar to the plate 39.

The basic principle carried through the different designs involves a cam action whereby the projection on the end of a hook or eye is directed toward an opening in the body of a lure or channel bar secured to the lure with a cam action and wherein the hook is locked by the projection in the lure or other device until the key is withdrawn manually permitting the projection on the shank of the hook or eye to drop from the opening, whereby the hook or eye may be released and withdrawn from the line.

It will be understood that modifications, within the scope of the appended claims, may be made in the design and arrangement of the parts without departing from the spirit of the invention.

What is claimed is:

1. A fish lure comprising an arcuate body having an opening therethrough, an elongated enclosed channel on the inner surface of the body, a fish hook with a shank having a projection on the end thereof and having an arcuate outer surface at the intersection of the shank with the projection, positioned in the channel with the projection in the opening of the body, and a rod having a cam with a tapering nose on one end slidably mounted in the channel and positioned to, selectively, lock the projection on the end of the shank of the hook in the opening of the body, or upon a longitudinal withdrawal movement thereof release the said projection and hook.

2. A fish lure comprising an arcuate body having an opening therethrough, an elongated enclosed channel positioned against the inner surface of the body, and a fish hook with a shank having a projection on the end thereof and having an arcuate outer surface at the intersection of the shank with the projection positioned in the channel with the projection extending into the opening of the body, and a rod having a tapering cam surface on the end slidably mounted in the channel and positioned to engage the arcuate surface at the intersection of the projection and shank for urging the projection of the shank of the fish hook in the opening of the body and wherein upon withdrawal of the rod the projection and shank are released.

3. A fishing lure comprising an elongated arcuate body having a curved channel on the under surface and an opening therethrough, a key slidably mounted in the channel, and a fish hook having a shank with a projection thereon whereby with the shank of the hook extended into the channel the projection is urged into the opening of the lure by the key definitely locking the hook in the lure, and wherein upon withdrawal of the key the projection and shank are released.

4. In a fish lure, the combination which comprises an elongated spoon, having an elongated channel U-shaped on the under surface, said spoon having an opening through the outer surface and positioned to register with the channel, a key having a cam surface on the extended end slidably mounted in the channel and having an offset section for retaining the key in operative position therein, and a fish hook having a shank with a projection on the end positioned with the projection retained in the opening of the spoon by the key, a projection being released by withdrawing the said key.

5. In a fishing lure coupling, the combination which comprises an elongated spoon, a key having a tapering nose slidably mounted on the spoon, a fish hook having a shank with a projection thereon and having an arcuate outer surface at the intersection of the shank with the projection, and a fishing line to which the spoon is attached, said spoon having an opening positioned to receive the projection of the shank of the hook and said key being positioned whereby the tapering nose is contacted by the arcuate surface at the intersection of the projection with the shank providing a guide for directing the projection into the opening of the body and to retain the projection in said opening, the projection and fish hook being released upon withdrawal of the key.

References Cited in the file of this patent

UNITED STATES PATENTS

| | | |
|---|---|---|
| 813,500 | Kausch | Feb. 27, 1906 |
| 2,523,833 | Lando | Sept. 26, 1950 |
| 2,556,117 | Smith | June 5, 1951 |

FOREIGN PATENTS

| | | |
|---|---|---|
| 266,807 | Germany | Feb. 4, 1913 |